(12) United States Patent
Matsumoto et al.

(10) Patent No.: US 10,908,834 B2
(45) Date of Patent: Feb. 2, 2021

(54) LOAD BALANCING FOR SCALABLE STORAGE SYSTEM

(71) Applicant: HITACHI, LTD., Tokyo (JP)

(72) Inventors: Shinya Matsumoto, Farmington Hills, MI (US); Akira Yamamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/455,932

(22) Filed: Jun. 28, 2019

(65) Prior Publication Data
US 2020/0409584 A1 Dec. 31, 2020

(51) Int. Cl.
*G06F 12/00* (2006.01)
*G06F 3/06* (2006.01)

(52) U.S. Cl.
CPC ............ *G06F 3/0647* (2013.01); *G06F 3/067* (2013.01); *G06F 3/0611* (2013.01); *G06F 3/0653* (2013.01)

(58) Field of Classification Search
CPC ..... G06F 3/0647; G06F 3/0611; G06F 3/0653
See application file for complete search history.

(56) References Cited

U.S. PATENT DOCUMENTS

| | | | |
|---|---|---|---|
| 2008/0046779 A1* | 2/2008 | Merchant | G06F 3/0647 714/6.12 |
| 2013/0151683 A1* | 6/2013 | Jain | G06F 3/0646 709/223 |
| 2013/0332608 A1 | 12/2013 | Shiga et al. | |
| 2014/0310418 A1* | 10/2014 | Sorenson, III | H04L 67/288 709/226 |
| 2015/0281345 A1* | 10/2015 | Kobayashi | H04L 67/1008 709/226 |
| 2017/0070571 A1* | 3/2017 | Branson | G06F 3/0635 |

* cited by examiner

*Primary Examiner* — Baboucarr Faal
(74) *Attorney, Agent, or Firm* — Mattingly & Malur, PC

(57) ABSTRACT

In some examples, a load on a first node of a plurality of nodes, over a period of time, may be determined based at least in part on comparing a load parameter with a load threshold. When the load parameter exceeds the load threshold, one or more nodes may be randomly selected from the plurality of nodes. Furthermore, an access load to move from the first node may be determined. The access load may correspond at least partially to data access requests received from user computing devices over the period of time. In addition, at least one node from the randomly selected one or more nodes may be determined that is able to receive the access load. A portion of data may be transferred from the first node to the at least one node. For instance, the portion of data transferred may be based on the access load.

20 Claims, 13 Drawing Sheets

| NODE ID | SERVICE TYPE | IP ADDRESS |
|---|---|---|
| M1 | Metadata | 192.168.0.1 |
| M2 | Metadata | 192.168.0.2 |
| M3 | Metadata | 192.168.0.3 |
| M4 | Metadata | 192.168.0.4 |
| M5 | Metadata | 192.168.0.5 |
| ... | ... | ... |
| D1 | Data | 192.168.1.1 |
| D2 | Data | 192.168.1.2 |
| D3 | Data | 192.168.1.3 |
| D4 | Data | 192.168.1.4 |
| D5 | Data | 192.168.1.5 |
| ... | ... | ... |

FIG. 4

| DATA INTERNAL NAME ~602 | STORED LOCATION ~604 |
|---|---|
| ABCDE | D1:/mnt/data/ABCDE |
| BCDEF | D2:/mnt/data/BCDEF |
| CDEFG | D3:/mnt/data/CDEFG |

FIG. 6

| PROCESSOR UTILIZATION | PROCESSOR UTILIZATION THRESHOLD | INDICATOR (OF WHETHER THE NODE IS CURRENTLY IN A NODE GROUP) |
|---|---|---|
| 90 % | 80 % | No |

| NODE ID | PROCESSOR UTILIZATION ~904 | ACCESS COUNT ~906 | PERFORMANCE INDICATOR ~908 | TRANSFER TYPE ~910 | ACCESS LOAD TO BE MOVED ~912 | PROCESSOR UTILIZATION THRESHOLD ~913 |
|---|---|---|---|---|---|---|
| M1 | 90 % | 1800 | 20 | OUT | 200 | 80 % |
| M12 | 75 % | 750 | 10 | IN | 50 | 80 % |
| M33 | 70 % | 700 | 10 | IN | 100 | 80 % |

FIG. 9

| NODE ID | PROCESSOR UTILIZATION | ACCESS COUNT | PERFORMANCE INDICATOR | TRANSFER TYPE | ACCESS LOAD TO BE MOVED | PROCESSOR UTILIZATION THRESHOLD |
|---|---|---|---|---|---|---|
| M1 | 90 % | 1800 | 20 | OUT | 200 | 80 % |
| M12 | 75 % | 750 | 10 | IN | 50 | 80 % |
| M33 | 70 % | 700 | 10 | IN | 100 | 80 % |
| M3 | 20 % | 200 | 10 | IN | 600 | 80 % |
| M17 | 40 % | 400 | 10 | IN | 400 | 80 % |

FIG. 10

LOAD BALANCING FOR SCALABLE STORAGE SYSTEM

BACKGROUND

Various different types of data storage systems may be configured to include scalability. As one example of a scalable storage system, a distributed key-value store may include multiple storage nodes that may be used to store data for users, and may provide scalable capacity and scalable performance. For instance, data content may be stored on data storage computing devices referred to as "data nodes", while metadata that describes the data content may be stored on metadata computing devices referred to as "metadata nodes". Further, the scalable storage system may allow system administrators to add more nodes to improve system performance and capacity.

The performance of a scalable storage system may be expected to increase linearly as more nodes are added. However, load imbalance among the nodes may cause performance increases to be substantially less than linear. For example, failure to sufficiently balance the load across the nodes in the system can cause bottlenecks in the system. On the other hand, in large-scale storage architectures having many nodes, conventional load-balancing techniques used for balancing usage loads across a large number of nodes may result in a large amount of network communication traffic between the nodes and other systemic inefficiencies. This can slow down the communication network and cause inefficiency throughout the storage system.

SUMMARY

In some implementations, a load on a first node of a plurality of nodes, over a period of time, may be determined based at least in part on comparing a load parameter with a load threshold. When the load parameter exceeds the load threshold, one or more nodes may be randomly selected from the plurality of nodes. Furthermore, an access load to move from the first node may be determined. The access load may correspond at least partially to data access requests received from user computing devices over the period of time. In addition, at least one node from the randomly selected one or more nodes may be determined that is able to receive the access load. A portion of data may be transferred from the first node to the at least one node. For instance, the portion of data transferred may be based on the access load.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 4 illustrates an example system configuration data structure according to some implementations.

FIG. 6 illustrates an example node object data structure according to some implementations.

FIG. 7 illustrates an example node resource information data structure according to some implementations.

FIG. 9 illustrates an example node load calculation data structure according to some implementations.

FIG. 10 illustrates an example node load calculation data structure according to some implementations.

DESCRIPTION

Figure 1:
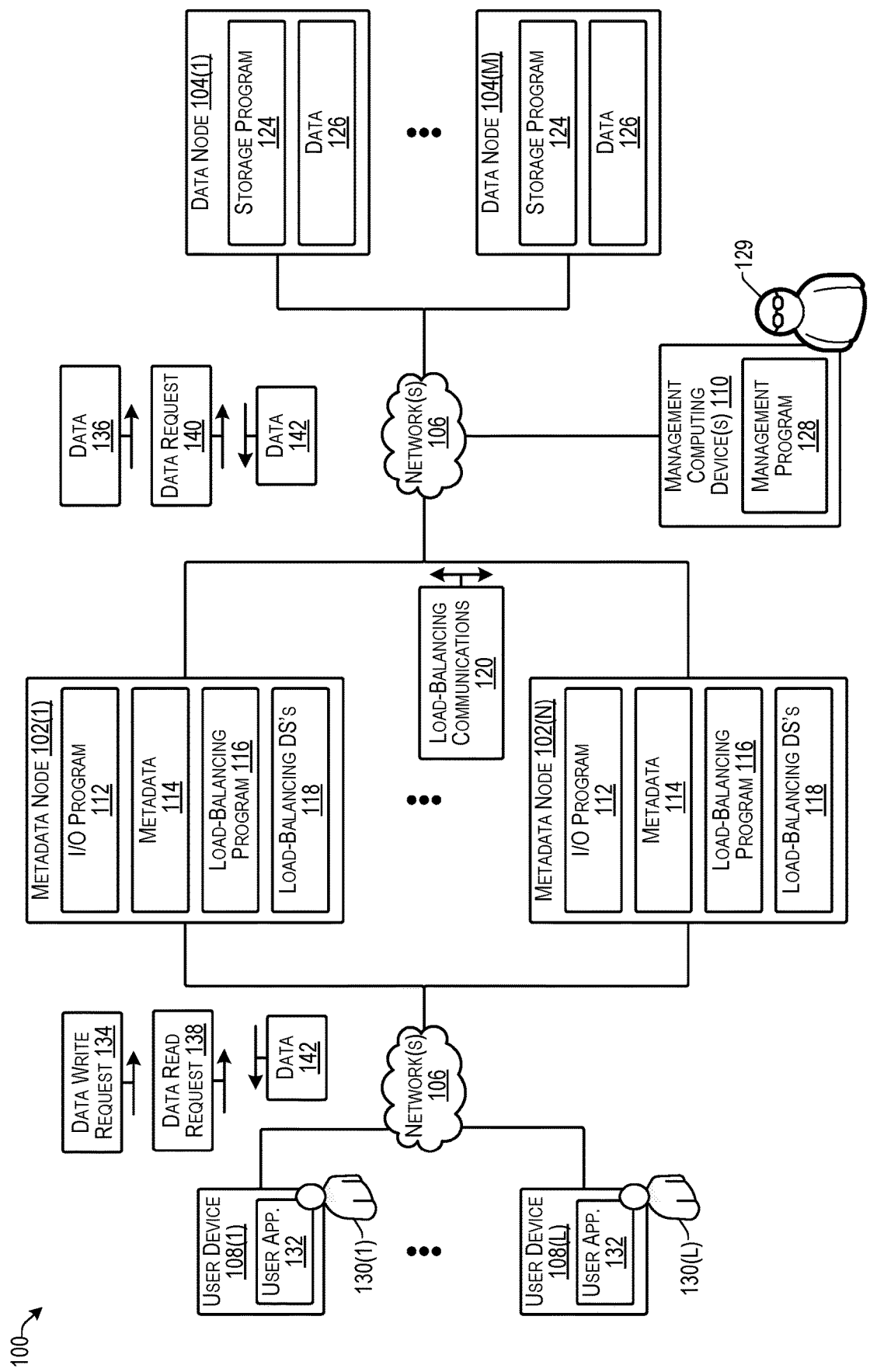
FIG. 1 illustrates an example architecture of a system able to perform load balancing according to some implementations.

Some implementations herein are directed to techniques and arrangements for load balancing in a scalable storage system while reducing the amount of communications utilized for the load balancing, such as in comparison to conventional techniques. Accordingly, implementations are able to improve the overall efficiency of load balancing in large scalable storage systems by limiting the number of communications between nodes for performing load balancing, thereby reducing network traffic and reducing the processing requirements of the nodes in the system.

In some examples, a scalable storage system herein may store at least two types of information, namely, data and metadata. Examples of data may include content data, e.g., data object content, such as information a client computer writes to the system, which may include content of documents, music, videos, images, and various other types of data. On the other hand, examples of metadata may include information used for management of the data or that describes the data, data objects, etc., such as a type of the data, size of the data, a creation timestamp, owner of the data, access control information, and tags that a client computer may associate with the data. In addition, the metadata for an object or other data may further include an internal name of the data, which may include an indication as to which data node in the system stores the data.

In examples herein, a scalable storage system that performs load balancing may include a plurality of metadata nodes and a plurality of data nodes. For performing load balancing across the plurality of metadata nodes, each metadata node may monitor its own load, such as a data access load, for determining whether it is desirable for the metadata node to perform load balancing to reduce the load. When one of the metadata nodes determines that its current load exceeds a threshold amount, and the metadata node may determine that it is overloaded and may perform load-balancing by selecting, e.g. at random, a given number of other metadata nodes for forming a metadata node group. The overloaded metadata node may determine a portion of metadata to be transferred to one or more other metadata nodes for performing load balancing, and may further determine whether the metadata nodes in the metadata node group are able to receive the determined portion of metadata while remaining able to operate within a threshold performance level after receiving the metadata from the overloaded metadata node. If the metadata nodes within the node group are able to meet these requirements, the overloaded metadata node may migrate data to the one or more other metadata nodes in the metadata node group. On the other hand, if the metadata nodes in the current metadata node group are not able to receive the portion of data to be transferred while still meeting threshold performance requirements, the overloaded metadata node may form a new metadata node group by randomly selecting one or more different metadata nodes for the new metadata node group, and determining whether the metadata nodes in the new metadata node group are able to receive the transfer of metadata from the overloaded metadata node.

Because the overloaded metadata node only communicates with a limited number of other metadata nodes, the communications for performing load balancing are substantially less than when conventional load-balancing techniques are employed. Thus, the system may enable the overloaded metadata node to balance its load among several other metadata nodes that store metadata without having to communicate with dozens or even hundreds of other metadata nodes in the system. Furthermore, while some examples are described in the context of load balancing on metadata nodes, implementations herein are not limited to load balancing on the metadata nodes but may also be applied to load balancing on the data nodes using similar node group selection and balancing techniques. Accordingly, examples herein may be applied to balancing the load across a plurality of metadata nodes, across a plurality of data nodes, or in various other storage system arrangements including multiple nodes in which load balancing is desired.

For discussion purposes, some example implementations are described in the environment of a plurality of metadata nodes in communication with a plurality of data nodes and one or more user computing devices that enables efficient load balancing. However, implementations herein are not limited to the particular examples provided, and may be extended to other types of computing system architectures, other types of storage environments, other types of client configurations, other types of data, and so forth, as will be apparent to those of skill in the art in light of the disclosure herein. For instance, in some examples herein may include an object storage system, but implementations herein are not limited to object storage systems, and may also include block storage systems that may be accessed via iSCSI, Fibre Chanel, and Fibre Channel over Ethernet, and the like, Further, some examples herein may include a file storage system that may be accessed via Network File System protocol and/or Common Internet File System protocol, and so forth. Accordingly, implementations herein are not limited to use with the particular examples provided.

FIG. 1 illustrates an example architecture of a system 100 able to perform load balancing according to some implementations. The system 100 includes a plurality of metadata computing devices, also referred to as metadata nodes 102(1)-102(N), which are able to communicate with, or otherwise coupled to, a plurality of data storage computing devices, also referred to as data nodes 104(1)-104(M), such as through one or more networks 106. Further, the metadata nodes 102 are able to communicate over the network(s) 106 with one or more user computing devices, such as user devices 108(1)-108(L), which may be any of various types of computing devices, as discussed additionally below. In addition, one or more management computing devices 110 are able to communicate with the metadata nodes 102 and the data nodes 104, such as through the network(s) 106.

The one or more networks 106 may include any suitable network, including a wide area network, such as the Internet; a local area network (LAN), such as an intranet; a wireless network, such as a cellular network, a local wireless network, such as Wi-Fi, and/or short-range wireless communications, such as BLUETOOTH®; a wired network including Fibre Channel, fiber optics, Ethernet, or any other such network, a direct wired connection, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail. Accordingly, the metadata nodes 102, the data nodes 104, the user devices 108, and the management computing device(s) 110 are able to communicate over the one or more networks 106 using wired and wireless connections, or combinations thereof.

The metadata nodes 102 may include one or more servers or any other suitable computing devices, as discussed additionally below, e.g., with respect to FIG. 2. The metadata nodes 102 may each include an input/output (I/O) program 112 that may be executed on each metadata node 102 to enable the metadata nodes 102 to respond to requests from the user devices such as for storing user data, providing access to stored data, and so forth. Further, the I/O program 112 may manage storage of metadata 114 that is related to the user data and that may also include system metadata that is generated by the I/O program, such as for determining an internal name and storage location for each stored data object or other stored data. Thus, the metadata 114 may include information about the stored data and may further include information regarding where the data is stored on the data nodes 104, such as to enable storing and accessing the data on the data nodes 104. In some examples, the metadata 114 may be stored by the metadata node 102 in a database or other type of data structure managed by the I/O program 112.

In addition, the metadata nodes 102 may include a load-balancing program 116 that may be executed on individual ones of the metadata nodes 102(1)-102(N) to enable the respective metadata nodes 102(1)-102(N) to perform load balancing, such as depending on an access load on the respective metadata nodes 102(1)-102(N). When performing load balancing, the load-balancing program 116 may employ a plurality of load-balancing data structures (DS's) 118, which are discussed additionally below. Further, as mentioned above and as discussed additionally below, when performing load balancing, an overloaded metadata node 102 may exchange load-balancing communications 120 with one or more other metadata nodes 102, such as through the one or more networks 106, to locate one or more other metadata nodes 102 able to receive a portion of the metadata managed by the overloaded metadata node 102.

The data nodes 104 may include one or more servers, storage systems, storage controllers, storage arrays, network storage, and/or any other suitable computing devices able to store data, as discussed additionally below, e.g., with respect to FIG. 3. For instance, individual data nodes 104 may execute a storage program 124 for managing the storage of data 126 by the respective data nodes 104. The data nodes 104 may be configured by the storage program 124 to store the data 126 when received from the metadata nodes 102, and to retrieve the data 126 when requested by the metadata nodes 102. In addition, the storage program 124 may configure the data nodes 104 to perform other various other storage functions, such as for providing redundancy, remote replication, archiving, storage protection levels, storage class hierarchies, disaster recovery, garbage collection, and so forth.

The management computing device(s) 110 may execute a management program 128 that may be used by an administrator 129 for managing the system 100. For example, the administrator 129 may be responsible for adding more metadata nodes 102 and/or data nodes 104 to the system 100. In addition, the administrator 129 may be responsible for configuring and managing the nodes 102, 104 in the system 100 for ensuring proper operation, as is known in the art.

Each user device 108 may be any suitable type of computing device such as a desktop, laptop, tablet computing device, mobile device, smart phone, wearable device, and/or any other type of computing device able to send data over a network. Users 130(1)-130(L) may be associated with user devices 108(1)-108(L), respectively, such as through a respective user account, user login credentials, or the like. Furthermore, the user devices 108 may be able to communicate with the metadata nodes 102 through the one or more networks 106 or through any other suitable type of communication connection.

Further, each user device 108(1)-108(L) may include a respective instance of a user application 132 that may execute on the respective user device 108(1)-108(L), such as for communicating with the I/O program 112, e.g., for sending user data for storage on the data nodes 104 and/or for receiving stored data from the data nodes 104. In some cases, the user application 132 may include a browser or may operate through a browser, and the I/O program 112 may include a web application for enabling the user 130 to access stored data 126 through one of the metadata nodes 102. Alternatively, in other cases, the user application 132 may include any other type of application having communication functionality enabling communication with the I/O program 112 over the one or more networks 106. In the system 100, the users 130 may store data to, and receive data from, the metadata nodes 102 that their respective user devices 108 are in communication with. Accordingly, one or more of the metadata node 102 may provide local storage for the users 130 and respective user devices 108. During steady state operation there may be multiple users 108 periodically communicating with respective ones of the metadata nodes 102 for storing and retrieving data.

In the example of FIG. 1, suppose that a first user 130(1) uses the user application 132 to send a write request 134 from the first user device 108(1) to the first metadata node 102(1) for storing data 136. The I/O program 112 may be executed on the first metadata node 102(1) to send the data 136 to a selected one of the data nodes 104, such as based on techniques described additionally below. In some cases, the data 136 may be compressed and/or encrypted by the I/O program 112 before sending to the data node 104. The I/O program 112 on the metadata node 102(1) may further generate and store metadata for the data 136, and may store this metadata as part of the metadata 114. The storage program 124 executing on the data node 104 may receive the data 136, and may store the data 136 as part of the data 126 stored and managed by the data node 104.

In addition, the first user 130(1) may use the first send a data read request 138 to the first metadata node 102(1) to request that certain data be provided by the metadata node 102(1). In response, the metadata node 102(1) may execute the I/O program 112 to access the metadata 114 to determine the storage location of the requested data. The I/O program 112 causes the metadata node 102(1) to send a data request 140 to the identified data node 104 to retrieve the requested data. In response, the storage program 124 executing on the data node 104 may receive the data request 140, may retrieve the corresponding data 142 from the data 126 managed by the data node 104, and may send the data 142 to the metadata node 102(1). The I/O program 112 on the metadata node 102(1) may perform any decryption or decompression of the data 142 if necessary, and may send the data 142 to the user device 108(1).

In the example of FIG. 1, suppose that, over a period of time, the first metadata node 102(1) receives a large number of data write requests, data read requests, or any of various other access requests. The first metadata node 102(1) may compare its load over the period of time with a threshold load. Examples of load indicating parameters that may be used to determine the load on the metadata node may include processor utilization, memory utilization, access count, average response time, and/or various other load parameters, as will be apparent to those of skill in the art having the benefit of the disclosure herein. When the first metadata node 102(1) determines that it is overloaded, the first metadata node 102(1) may perform load balancing by selecting, at random, a given number of other metadata nodes 102 for forming a metadata node group. Further, the first metadata node 102(1) may determine a portion of the metadata 114 to be transferred to one or more other metadata nodes 102 for performing load balancing.

Based at least partially on the load-balancing data structures 118, as discussed additionally below, the first metadata node 102(1) may identify one or more of the metadata nodes 102 in the metadata node group that are able to receive the metadata portion while remaining able to operate within a threshold performance level after receiving the metadata portion. The first metadata node 102(1) may then transfer the metadata portion to the identified one or more other metadata nodes 102. Because the first metadata node 102(1) only communicates with a limited number of other metadata nodes 102, the load-balancing communications 120 for performing the load balancing are substantially less than when conventional load-balancing techniques are employed. Thus, the system 100 may enable the first metadata node 102(1) to balance its load among several other metadata nodes 102 without having to communicate with dozens or even hundreds of other metadata nodes in the system 100.

Furthermore, while one example configuration of a system is described with reference to FIG. 1, numerous other configurations will be apparent to those of skill in the art having the benefit of the disclosure herein. For instance, in the example of FIG. 1, the metadata node 102, the data node 104, and the management computing device 110 are illustrated as separate physical computing devices. However, in other examples, some or all of these computing devices 102, 104, and 110 may be implemented as a single physical computing device. In other words, individual nodes in the system 100 may be configured to function concurrently as at least one of a metadata node 102, a data node 104 and a management computing device 110.

Figure 2:
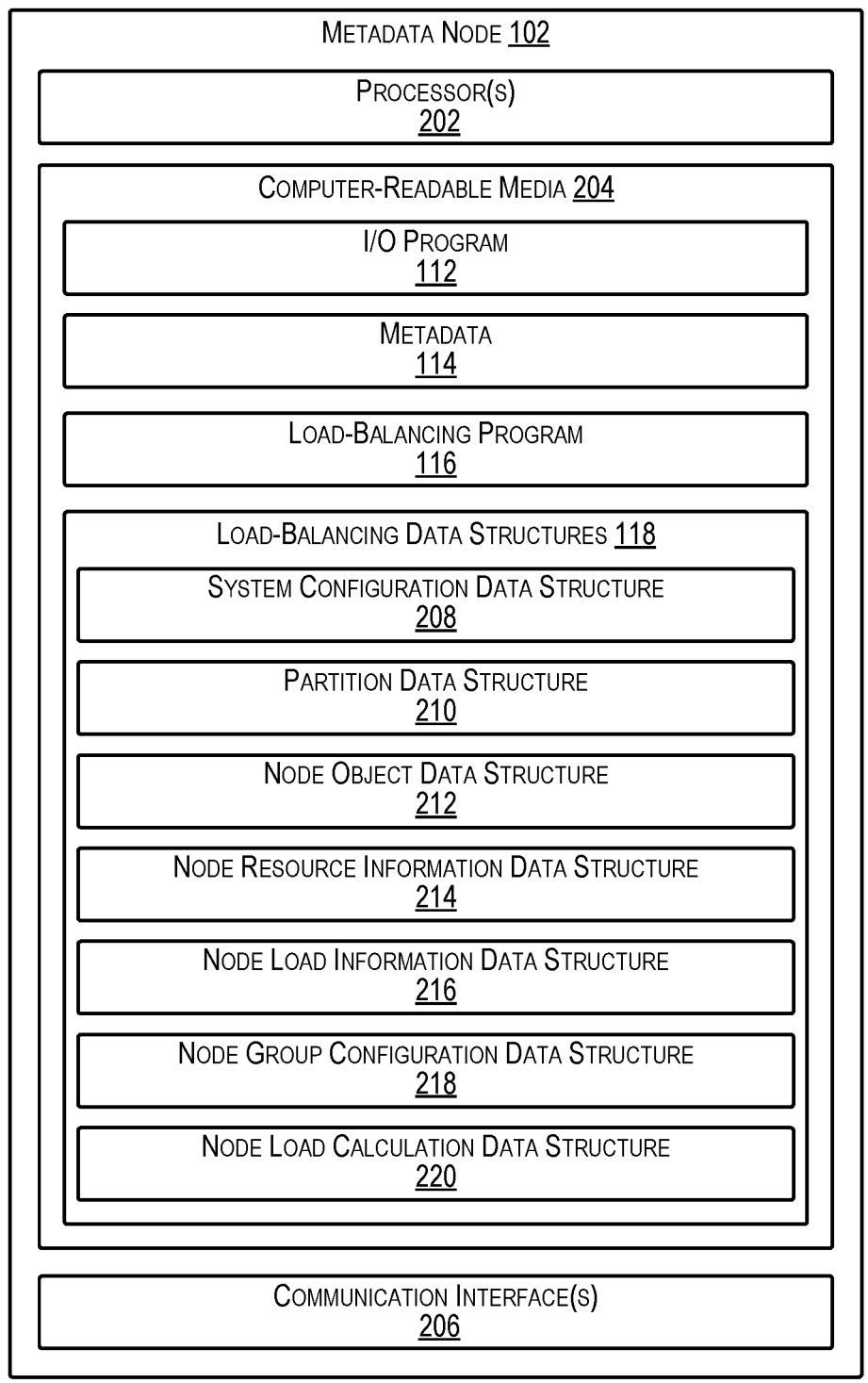
FIG. 2 illustrates an example hardware and logical configuration of a metadata node according to some implementations.

FIG. 2 illustrates an example hardware and logical configuration of a metadata node 102 according to some implementations. In some examples, the metadata node 102 may include one or more servers that may be embodied in any number of ways. For instance, the programs, other functional components, and at least a portion of data storage of the metadata node 102 may be implemented on at least one server, such as in a cluster of servers, a server farm, a data center, a cloud-hosted computing service, and so forth, although other computer architectures may additionally or alternatively be used. In the illustrated example, the metadata node 102 includes, or may have associated therewith, one or more processors 202, one or more computer-readable media 204, and one or more communication interfaces 206.

Each processor 202 may be a single processing unit or a number of processing units, and may include single or multiple computing units, or multiple processing cores. The processor(s) 202 can be implemented as one or more central processing units, microprocessors, microcomputers, microcontrollers, digital signal processors, state machines, logic circuitries, and/or any devices that manipulate signals based on operational instructions. As one example, the processor(s) 202 may include one or more hardware processors and/or logic circuits of any suitable type specifically programmed or configured to execute the algorithms and processes described herein. The processor(s) 202 may be configured to fetch and execute computer-readable instructions stored in the computer-readable media 204, which may program the processor(s) 202 to perform the functions described herein.

The computer-readable media 204 may include both memory and storage. For example, the computer-readable media 204 may include volatile and nonvolatile memory and/or removable and non-removable media implemented in any type of technology for storage of information, such as computer-readable instructions, data structures, program modules, or other data. The computer-readable media 204 may include, but is not limited to, RAM, ROM, EEPROM, flash memory or other memory technology. Further, the computer-readable media 204 may include optical storage, solid-state storage, magnetic tape, magnetic disk storage, RAID storage systems, storage arrays, network-attached storage, storage area networks, cloud storage, or any other medium that can be used to store the desired information and that can be accessed by a computing device. Depending on the configuration of the metadata node 102, the computer-readable media 204 may include a tangible non-transitory media to the extent that, when mentioned, non-transitory computer-readable media exclude media such as energy, carrier signals, electromagnetic waves, and/or signals per se. In some cases, the computer-readable media 204 may be at the same location as the metadata node 102, while in other examples, a portion of the computer-readable media 204 may be partially remote from the metadata node 102. For instance, in some cases, the computer-readable media 204 may include a portion of storage in one or more of the data nodes 104.

The computer-readable media 204 may be used to store any number of functional components that are executable by the processor(s) 202. In many implementations, these functional components comprise instructions or programs that are executable by the processor(s) 202 and that, when executed, specifically program the processor(s) 202 to perform the actions attributed herein to the metadata node 102. Functional components stored in the computer-readable media 204 may include the I/O program 112 and the load-balancing program 116, each of which may include one or more computer programs, applications, executable code, or portions thereof. For example, the I/O program 112 may provide communication functionality with the user devices 108 and the data nodes 104, as well as managing the metadata 114.

The load-balancing program 116 may be configured to perform the load-balancing operations described herein. For example, the load-balancing program 116 may monitor the load on the metadata node 102, such as periodically, when triggered by the I/O program or through various other techniques. When a threshold load is exceeded, the load-balancing program 116 may perform load balancing to transfer a portion of metadata 114 to one or more other metadata nodes 102, as described in additional detail elsewhere herein.

In addition, the computer-readable media 204 may store data, data structures, and other information used for performing the functions and services described herein. For example, the computer-readable media 204 may store the metadata 114. In addition, the computer-readable media 204 may store the load-balancing data structures 118, which may include a system configuration data structure 208, a partition data structure 210, a node object data structure 212, a node resource information data structure 214, a node load information data structure 216, a node group configuration data structure 218, and a node load calculation data structure 220.

The content of the system configuration data structure 208, the partition data structure 210, and the node group configuration data structure 218 may be the same across all of the metadata nodes 102 in the system. For example, if one of these data structures 208, 210 or 218 is modified, then a modification instruction may be sent to each of the metadata nodes 102 in the system to ensure uniformity of the information in the data structures 208, 210 or 218 across all of the metadata nodes 102. On the other hand, the data structures 212-216 and 220 do not store the same content for each metadata node 102, but instead store the information that is specific for the particular metadata node 102 at which they reside. Details of each of the data structures 208-220 are discussed additionally below.

The metadata node 102 may also include or maintain other functional components and data, which may include programs, drivers, etc., and the data used or generated by the functional components. Further, the metadata node 102 may include many other logical, programmatic, and physical components, of which those described above are merely examples that are related to the discussion herein.

The one or more communication interfaces 206 may include one or more software and hardware components for enabling communication with various other devices, such as over the one or more network(s) 106. Thus, the communication interfaces 206 may include, or may couple to, one or more ports that provide connection to the network(s) 106 for communicating with the data nodes 104, the other metadata nodes 102, the user devices 108, and the management computing device(s) 110. For example, the communication interface(s) 206 may enable communication through one or more of a LAN, the Internet, cable networks, cellular networks, wireless networks (e.g., Wi-Fi) and wired networks (e.g., Fibre Channel, fiber optic, Ethernet), direct connections, as well as close-range communications such as BLUETOOTH®, and the like, as additionally enumerated elsewhere herein.

Figure 3:
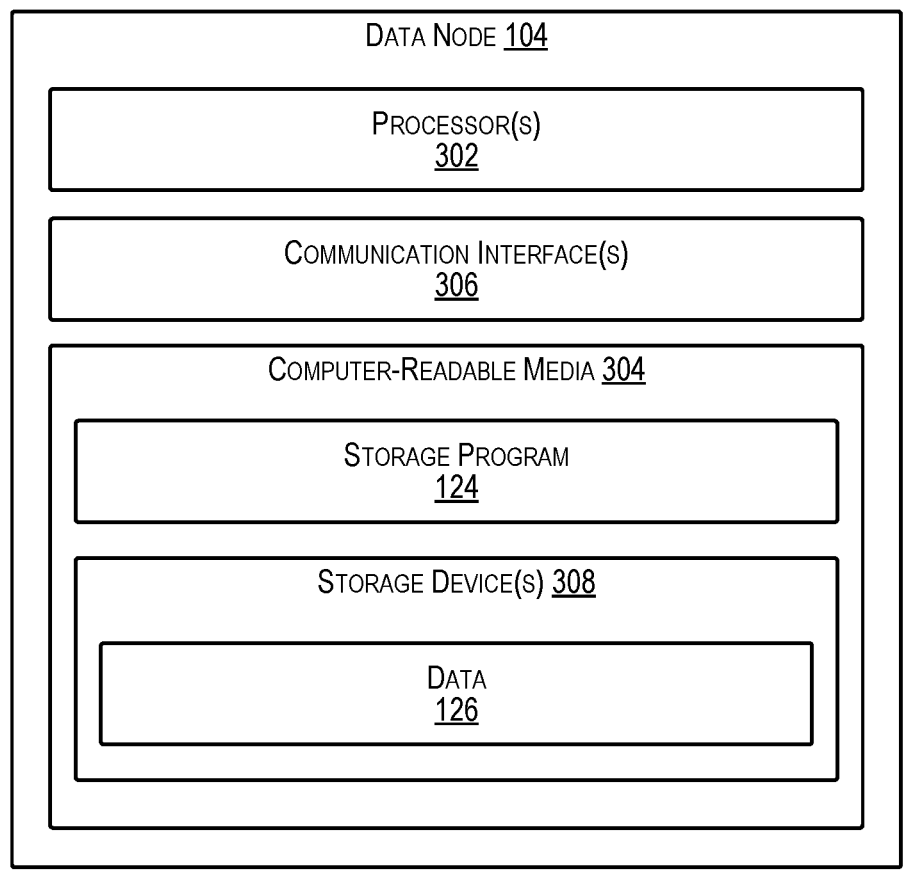
FIG. 3 illustrates an example hardware and logical configuration of a data node according to some implementations.

FIG. 3 illustrates an example hardware and logical configuration of a data node 104 according to some implementations. In some examples, the data node 104 may include one or more servers that may be embodied in any number of ways. For instance, the programs, other functional components, and at least a portion of data storage of the data node 104 may be implemented on at least one server, such as in a cluster of servers, a server farm, a data center, a cloud-hosted computing service, and so forth, although other computer architectures may additionally or alternatively be used. The data nodes 104 may each include one or more processors 302, one or more computer-readable media 304, and one or more communication interfaces 306. For example, the processors 302 may correspond to any of the examples discussed above with respect to the processors 202, the computer-readable media 304 may correspond to any of the examples discussed above with respect to the computer-readable media 204, and the communication interfaces 306 may correspond to any of the examples discussed above with respect to the communication interfaces 206.

In the illustrated example, the computer-readable media 304 may include one or more storage devices 308 that may be used to store the data 126. In some examples, one or more dedicated storage controllers (not shown in FIG. 3) may be associated with the storage devices 308, such as in the case that the storage devices 308 are arranged in one or more arrays, or the like. For instance, as is known in the art, storage devices 308 may be configured in arrays, such as in a RAID configuration, JBOD configuration, or the like, and/or for presenting logical units based on the storage devices 308. The storage program 124 may be executed by the one or more processors 302 for managing the data 126, such as data objects or other data, stored on the underlying physical storage devices 156. As mentioned above, the storage devices 156 may be any type of storage device, such as hard disk drives, solid state drives, optical drives, magnetic tape, combinations thereof, or any other type of non-transitory computer-readable medium able to store electronic information. In some examples, the data nodes 104 may include commercially available cloud storage as is known in the art, while in other examples, the data nodes 104 may include private or enterprise storage systems accessible only by an entity associated with the metadata nodes 102.

The computer-readable media 304 may be used to store any number of functional components that are executable by the processor(s) 302. In many implementations, these functional components comprise instructions or programs that are executable by the processor(s) 302 and that, when executed, specifically program the processor(s) 302 to perform the actions attributed herein to the metadata node 102. Functional components stored in the computer-readable media 304 may include the storage program 124, which may include one or more computer programs, applications, executable code, or portions thereof. For example, the storage program 124 may be configured to perform the data storage and management functions described herein to cause the data node 104 to store and retrieve received data, manage retention periods, provide storage protection levels, and so forth, as discussed above.

In addition, the computer-readable media 304 may store the data 126, which may include data object content, data structures, and other information used for performing the functions and services described herein. The data node 104 may also include or maintain other functional components and data, which may include programs, drivers, etc., and the data used or generated by the functional components. Further, the data node 104 may include many other logical, programmatic, and physical components, of which those described above are merely examples that are related to the discussion herein.

FIG. 4 illustrates an example system configuration data structure 208 according to some implementations. The system configuration data structure 208 in this example includes a node ID 402 that indicates the identifier (ID) assigned to each node. For instance, the node ID 402 may be unique within the system 100 so that each metadata node and data node is individually distinguishable based on its node ID 402. The system configuration data structure 208 further includes a service type 404 and an IP address 406 for each node listed in the system configuration data structure 208. For example, the service type 404 may be either metadata or data, corresponding to whether the node is a metadata node 102 or a data node 104. In some examples, the value for the service type 404 may not be limited to metadata or data, but may include other types of nodes, combination metadata and data nodes, or the like.

Furthermore, the IP address 406 may be a permanent IP address assigned to the individual node that the other nodes may use for communication with the particular node corresponding to the node ID. In this example, the IPv4 format is used, but in other examples, the IPv6 format may be used, or any of various other techniques may be used for identifying the communication addresses of the individual nodes.

The system configuration data structure 208 may be generated when the system is initially set up, such as by a system administrator, or the like, using the management computing device 110 discussed above with respect to FIG. 1. The system configuration data structure 208 may be updated as nodes are added to the system or removed from the system. Furthermore, as mentioned above, each of the nodes 102 and 104 may include a copy of the system configuration data structure 208, and the information included in the system configuration data structure 208 may be the same across all of the nodes 102 and 104 in the system 100. Furthermore, while information for five metadata nodes M1-M5 and five data nodes D1-D5 is illustrated in this example, substantially more than five metadata nodes and five data nodes may be included in the system 100 herein in some examples.

Figure 5:
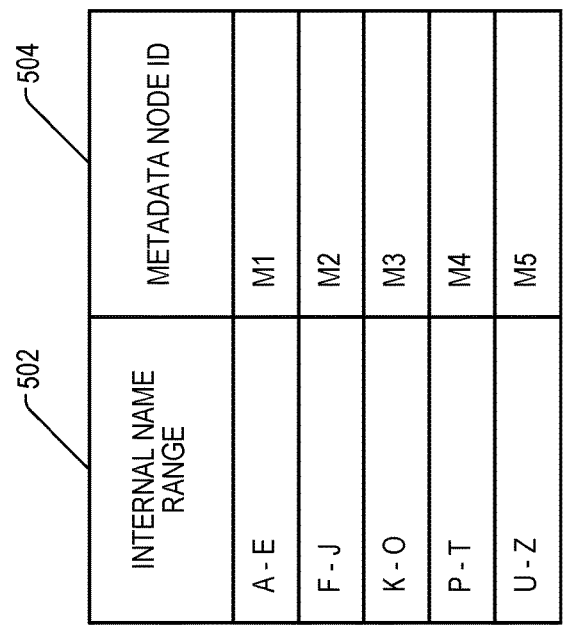
FIG. 5 illustrates an example partition data structure according to some implementations.

FIG. 5 illustrates an example partition data structure 210 according to some implementations. The partition data structure 210 includes an internal name range 502 and a corresponding metadata node ID 504. Accordingly, each row of the partition data structure 210 indicates a range of metadata and corresponding data that is managed by the identified metadata node indicated at 504.

The internal name range 502 shows a range of the internal name of objects, i.e., the name applied by the metadata node to an object when the object content is stored to one of the data nodes 104. For example, A-E indicates that the data objects having an internal name starting with A-E, for example, "AAA", "BCD", and "EFG" are managed by the corresponding metadata node, which has a metadata node ID 504 of "M1" in this example. In some cases, hash values may be calculated for the stored data and may be used for determining the internal name to use for the stored data. Additional details of generating the internal names for the stored data are discussed below.

The partition data structure 210 may be generated when the system 100 is initially configured. As one example, after generating the system configuration data structure 208, the management program 128 on the management computing device 110 may be executed to calculate and assign a hash space evenly among the metadata nodes 102. For example, if the hash space includes 26 characters of A-Z, and there are five metadata nodes M1-M5, one technique for the assignment may be 5, 5, 5, 5, 6 for M1, M2, M3, M4, M5, respectively, as shown in FIG. 5. Furthermore, in some cases, there may be a much larger number of metadata nodes such as 100 or more metadata nodes. Nevertheless, a similar technique may be used for distributing the initial internal name range among the metadata nodes 102 in the system 100.

In the illustrated example, each metadata node is assigned single sequential range, but in other examples, a metadata node may have multiple ranges assigned, which may be sequential or non-sequential. For example, metadata node M1 may have two non-sequential name ranges assigned (not shown in FIG. 5). Furthermore, in the illustrated example, the name ranges are shown as capital letters of the English alphabet, but the internal name ranges are not necessarily limited to this. For example, numbers, lower case letters, and/or other symbols may be used in addition to, or instead of uppercase letters. Numerous other variations will be apparent to those of skill in the art having the benefit of the disclosure herein.

As mentioned above, the partition data structure 210 may be included on all the metadata nodes 102 in the system 100, and may contain the same information across all the metadata nodes 102. Accordingly, any updates to the partition data structure 210 may be propagated to all of the metadata nodes 102 included in the system 100.

FIG. 6 illustrates an example node object data structure 212 according to some implementations. The node object data structure 212 includes a data internal name 602 and a respective stored location 604 for the data corresponding to each internal name. For example, the node object data structure 212 may be used for determining where particular data content is stored. For instance, in the illustrated example, the data having the internal name "ABCDE" is stored on data node "D1 at path "D1:/mnt/data/ABCDE". A new row may be added to the node object data structure 212 when a user device 108 sends a write request to a metadata node 102. For example, a directory to store objects may be configured when the system is initially configured as discussed additionally below. In some examples, the node object data structure 212 may be specific to each metadata node 102, and may include a listing of only the data content managed by the metadata node 102 by which the respective node object data structure 212 is maintained.

FIG. 7 illustrates an example node resource information data structure 214 according to some implementations. The node resource information data structure 214 may indicate the utilization of resources on an individual metadata node to which the data structure 214 pertains. A metadata node may use its own node resource information data structure 214 to determine whether it is overloaded, and may use the node resource information data structure 214 of other nodes to determine, at least in part, whether the other nodes are able to receive a transfer of a portion of metadata for load balancing.

The node resource information data structure 214 in this example includes processor utilization 702, processor utilization threshold 704, and an indicator 706 of whether the node is currently in a node group. For example, the processor utilization 702 indicates a load on the one or more processors of the respective metadata node over a latest (most recent) period of time, such as the past 15 minutes, half hour, hour, 2 hours, 6 hours, day, or so forth. In some cases, the time period may be set by the administrator or a user. The processor utilization field 702 may be updated periodically by the load-balancing program 116, which may monitor the processor utilization or other load parameters indicative of the load on the metadata node, such as memory utilization, number of access requests received, response time in responding to access requests, load average, and so forth. Accordingly, in some examples, the node resource information data structure 214 may additionally, or alternatively, include one or more other load parameters indicative of the load on the metadata node and corresponding thresholds set for those one or more other load parameters which, when exceeded may indicate that load balancing is to be performed.

The processor utilization threshold 704 (or other load parameter threshold(s)) may be set by a system administrator, and may indicate the threshold at which it is desirable to perform load balancing. In the illustrated example, processor utilization threshold 704 is set at 80 percent of maximum capacity, while the processor utilization 702 over the most recent period of time is indicated to be 90 percent of maximum capacity. Accordingly, based on the threshold 704 being exceeded, the load balancing program 116 may execute the load balancing process, as discussed additionally below, e.g., with respect to FIG. 10, to transfer some of the load to one or more other metadata nodes 102 in the system 100.

The indicator 706 of whether the node is currently in a node group may be used to indicate whether the particular metadata node is currently being considered as a candidate to receive transfer of metadata from another overloaded node. For example, as discussed below, multiple metadata nodes 102 may concurrently perform load balancing in the system 100. However, if a first overloaded node is considering a particular node as a candidate to transfer metadata to, it would not be desirable for a second overloaded node to also consider the same particular node as a candidate for receiving transfer metadata from the second overloaded node since it is currently unknown whether the first overloaded node will transfer a portion of metadata to the particular node and if so, how much. Additional details regarding selection of candidate nodes to receive transfer of metadata from an overloaded node are discussed below, e.g., with respect to FIGS. 9, 10 and 13.

The node resource information data structure 214 may be created at each metadata node 102 when the system 100 is initially configured. After that, processor utilization 702 may be updated periodically by detecting how much processor is utilized in the metadata node 102, such as by communication between the load balancing program 116 and an operating system of the metadata node, or through any of various other techniques.

Additionally, in some cases, as mentioned above, the resource information data structure 214 may include a plurality of load parameters (not shown in FIG. 7) in addition to the processor utilization 702. As one example, multiple load parameters may be employed by adding a "type" column that shows the type of each load parameter, such as processor utilization, memory utilization, number of access requests, and response time of the metadata node 102, and by including an "AND/OR" column that shows the respective threshold assigned to each of the respective load parameters. For example, the data structure may indicate that both processor utilization and memory utilization should exceed 90 percent of capacity or the response time or load average exceeds a respective threshold. In other words, various different thresholds may be set, and in some cases more than one of the thresholds may be required to be exceeded before load balancing is performed, while in other cases, it may be sufficient if any of the thresholds is exceeded. Numerous other variations will be apparent to those of skill in the art having the benefit of the disclosure herein.

Figure 8A:
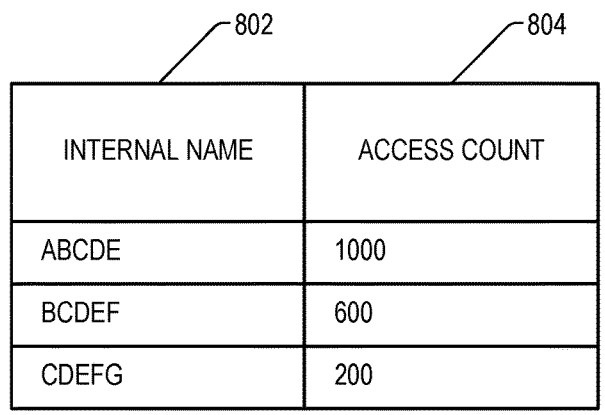
FIG. 8A illustrates an example node load information data structure according to some implementations.

FIG. 8A illustrates an example node load information data structure 216 according to some implementations. The node load information data structure 216 includes an internal name 802 and an access count 804. For example, the internal name 802 may be the internal names of all the data objects managed by the metadata node, and the access count 804 may be the number of accesses to the corresponding data content over a period of time. The load-balancing program 116 may monitor the accesses and/or may receive this information from the I/O program 112, and may periodically update the node load information data structure 216. For example, the accesses may include the number of user device reads, writes, or other actions taken with respect to the data corresponding to each internal name 802. The node load information data structure 216 is specific to the respective metadata node to which it pertains.

Figure 8B:
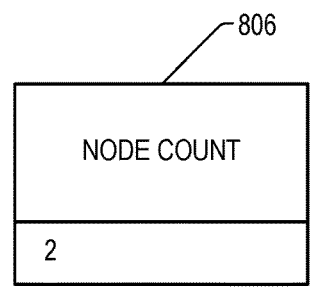
FIG. 8B illustrates an example node group configuration data structure according to some implementations.

FIG. 8B illustrates an example node group configuration data structure 218 according to some implementations. The node group configuration data structure 218 includes a node count 806. For example, the node count indicates how many nodes an overloaded node is to select at random for forming a node group for determining whether to transfer a portion of metadata to one or more of the selected nodes in the node group.

In the illustrated example, the node count 806 is set to a value of two, but more or few nodes may be selected in other examples. The node group configuration data structure 218 may be created when the system 100 is initially configured by an administrator. The administrator may be able to specify and change the node count 806 for the system 100. Typically, the node group configuration data structure 218 includes same content among all the metadata nodes 102 in the system 100.

FIG. 9 illustrates an example node load calculation data structure 220 according to some implementations. The node load calculation data structure 220 includes a node ID 902, processor utilization 904, access count 906, performance indicator 908, transfer type 910, access load to be moved 912, and processor utilization threshold 913. In this example, suppose that a first metadata node 102, having node ID "M1" has determined that it is overloaded based on information in the node resource information data structure 214, as discussed above with respect to FIG. 7. When the load-balancing program 116 on the metadata node M1 begins the load balancing process, the metadata node M1 may select two other nodes at random for forming a node group based on the node group configuration data structure 218, which indicates that the node count 806 for forming a node group is "2", as discussed above with respect to FIG. 8B. For example, the node M1 may select the metadata nodes for forming the node group using the listing of metadata nodes provided by the system configuration data structure 208 discussed above with respect to FIG. 4.

In some cases, a random number generator algorithm or pseudorandom number generator algorithm may be used for selecting the two metadata nodes at random from the system configuration data structure 208. Random number generator algorithms and pseudorandom number generator algorithms are well known in the art and are not described in detail herein. In the illustrated example, suppose that the metadata node M1 has selected metadata nodes having node IDs M12 and M33 to be in a node group with metadata node M1.

The metadata node M1 may further generate and populate the node load calculation data structure 220. For example, the metadata node M1 may use information from its own node resource information data structure 214 and its own node load information data structure 216 for generating the first row 914 of the node load calculation data structure 220. In addition, the metadata node M1 may request the resource information data structure 214 and the node load information data structure 216 from each of the selected metadata nodes M12 and M33, and upon their receipt, may use this information to populate rows 916 and 918, respectively, of the node load calculation data structure 220. For example, the processor utilization 904 may be obtained from the respective resource information data structures 214, and may indicate processor utilization over the most recent period of time for each of the respective metadata nodes M12 and M33. Further, the access count 906 may be obtained from the respective node load information data structures 216 and may indicate the total accesses over the most recent period of time for each of the respective metadata nodes M12 and M33.

In addition, the metadata node M1 may calculate the performance indicator 908 based on the processor utilization 904 and the access count 906. In this example, the performance indicator 908 may indicate a level of the metadata node performance. The performance indicator 908 may be calculated as the access count 906 divided by the processor utilization 904 for each metadata node. The processor utilization threshold 913 may be obtained from the resource information data structure 214.

The transfer type 910 indicates the type of access referred to in access load to be moved 912, and may be a Boolean value as either OUT or IN. For instance, "OUT" may indicate that the accesses should be transferred out from the metadata node, and "IN" may indicate that the accesses are to be moved in to the respective metadata node from the overloaded metadata node M1.

The "access load to be moved" 912 indicates an access load to be transferred, e.g., the number of accesses desired to be moved out of the overloaded metadata node M1 and into other metadata nodes M12 and M33 for load-balancing. Access load to be moved 912 may be determined based on processor utilization 904, the performance indicator 908, and the processor utilization threshold 913. The value for access load to be moved 912 may be calculated by first determining an absolute value of processor utilization 904 minus processor utilization threshold 913. The absolute value indicates how much processor utilization should be reduced by in the case of an overloaded node, or may be increased by in the case of an underloaded node. The absolute value may then be multiplied by the performance indicator 908 to determine the values for "access load to be moved" 912 for each respective metadata node in the node group.

In the illustrated example, the selected metadata nodes M12 and M33 in the node group do not have sufficient capacity to receive the access load to be moved from the metadata node M1. For example, the metadata node M1 wants to move metadata corresponding to 200 accesses, but metadata node M12 only has additional capacity for 50 accesses and metadata node M33 only has additional capacity for 100 accesses. Accordingly, the load-balancing program executing on the metadata node M1 may elect to form a new node group by selecting two alternative nodes at random from among the other metadata nodes in the system 100. The results are discussed below with respect to FIG. 10.

FIG. 10 illustrates an example node load calculation data structure 220 according to some implementations. In this example, the metadata node M1 has selected two other metadata nodes M3 and M17 to form a new node group. Accordingly, the metadata node M1 may add two new rows to the load calculation data structure 220, as indicated at 1002 and 1004. The metadata node M1 may request the resource information data structure 214 and the node load information data structure 216 from each of the selected metadata nodes M3 and M17, and upon their receipt, may use this information to populate rows 1002 and 1004, respectively, of the node load calculation data structure 220, as discussed above with respect to FIG. 9.

Further, in this example, the rows 916 and 918 are maintained in the load calculation data structure 220, but in other examples, the rows 916 and 918 may be deleted. For instance, the rows 916 and 918 may be maintained if there is some capacity to receive some transferred data, such as in the case that the transferred data might be transferred to multiple nodes, including, e.g., the node M33 in addition to one or more nodes in the new node group. On the other hand, if the rows 916 and 918 are deleted, the metadata node M1 may send a message to these nodes M12 and M33 indicating that they are no longer in a node group.

As indicated in FIG. 10, suppose that the load balance program on metadata node M1 determines that metadata node M3 has an available access load capacity of 600 that is able to be moved onto it, and that metadata node M17 has an available access load capacity of 400 that is able to be moved onto it. The metadata node M1 may transfer a portion of its metadata to either the metadata node M3, the metadata node M17, or to both of the metadata nodes M3 and M17. As one example, the load-balancing program may be configured to migrate metadata to the other metadata nodes in the node group so that each metadata node has approximately the same processor utilization. Alternatively, as another example, the load-balancing program may be configured to migrate a portion the metadata to the metadata node that has the largest available capacity so that only a single migration operation is performed. Other variations will be apparent to those of skill in the art having the benefit of the disclosure herein.

In addition, as mentioned above with respect to FIG. 7, multiple metadata nodes in the system 100 may execute the load-balancing program separately from, and concurrently with, the other metadata nodes in the system 100. To avoid adding a particular node to more than one node group at a time, a Boolean flag or other indicator may be included in the node resource information data structure 214 to indicate that the particular node is currently part of another node group. Accordingly, the node resource information data structure 214 may include the indicator 706 of whether the node is currently in a node group. Thus, when the indicator 706 is in a first condition (e.g., "Yes"), the particular node has already been added to a node group and is temporarily not eligible for consideration of additional metadata migration in a different node group. On the other hand, when the indicator 706 is in a second condition (e.g., "No"), the particular node is eligible to be included in a node group and considered as a candidate for migration.

Figure 11:
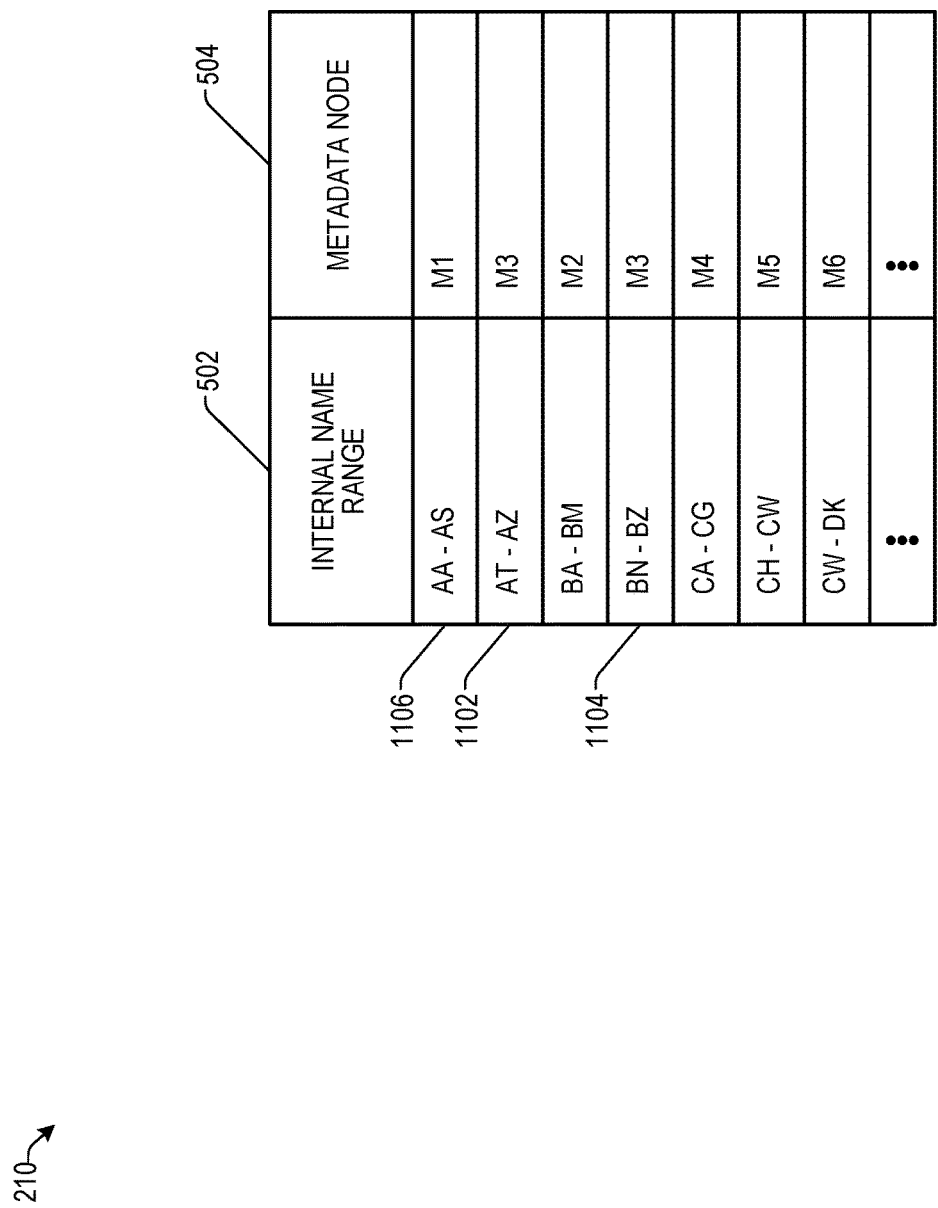
FIG. 11 illustrates an example partition data structure according to some implementations.

FIG. 11 illustrates an example partition data structure 210 corresponding to the example of FIG. 10 according to some implementations. The partition data structure 210 indicates a condition of partitions in the system following migration of a portion of metadata from the metadata node M1 to the metadata node M3, as discussed above with respect to FIG. 10. In this example, suppose that the metadata node M1 originally managed metadata corresponding to internal name range AA-AZ. Following the load balancing analysis discussed above with respect to FIGS. 9 and 10, suppose that metadata node M1 transfers metadata corresponding to internal name range AT-AZ to metadata node M3. Accordingly, as indicated at 1102 in the partition data structure 210, following the migration from node M1 to node M3, metadata corresponding to internal name range AT-AZ is now managed by metadata node M3, and metadata node M3 also manages internal name rage BN-BZ, as indicated at 1104. Further, metadata node M1 now manages internal name range AA-AS, as indicated at 1106. Accordingly, the load on metadata node M1 has been decreased while the load on metadata node M3 has been increased without the metadata node M1 having to communicate with all of the other nodes in the system 100, which may number in tens, hundreds, or even thousands of other nodes.

Figure 12:
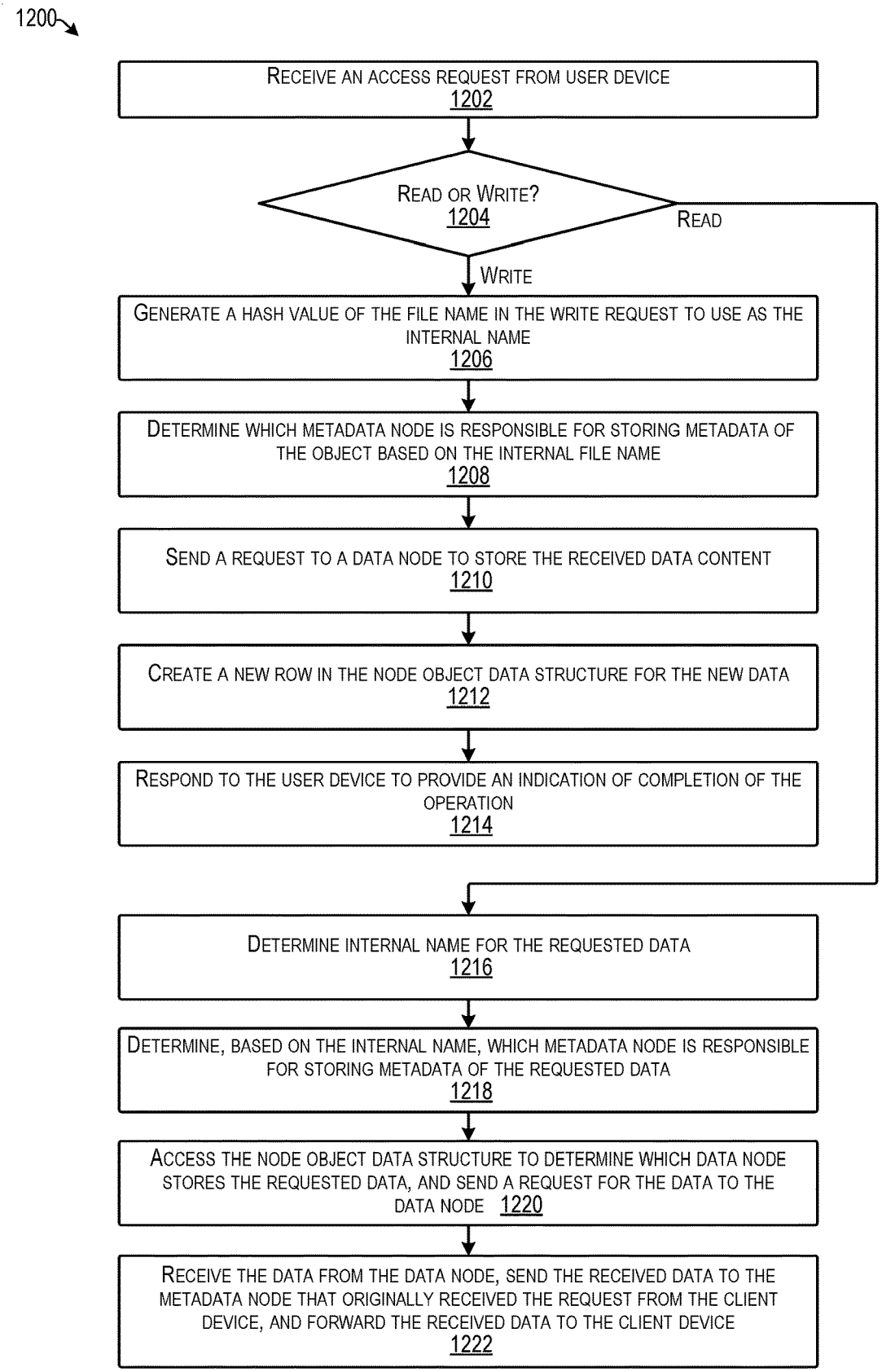
FIG. 12 is a flow diagram illustrating an example process performed by a metadata node executing the I/O program according to some implementations.
Figure 13:
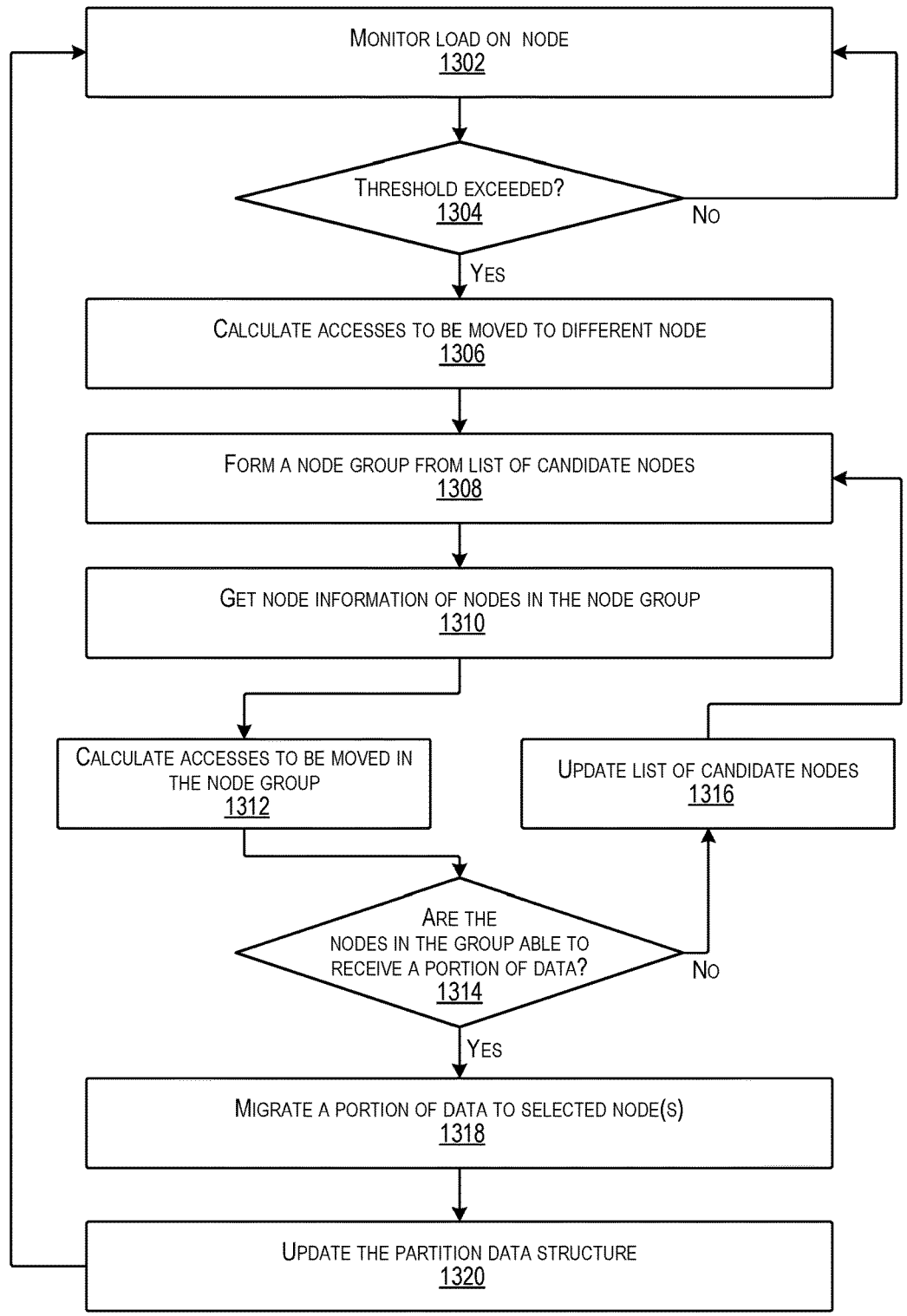
FIG. 13 is a flow diagram illustrating an example process for load balancing according to some implementations.

FIGS. 12 and 13 are flow diagrams illustrating example processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks, and systems described in the examples herein, although the processes may be implemented in a wide variety of other environments, frameworks, and systems.

FIG. 12 is a flow diagram illustrating an example process 1200 performed by a metadata node executing the I/O program 112 according to some implementations. For example, each metadata node 102 may execute the I/O program 112 in some cases.

At 1202, the metadata node may receive an access request from a user device, such as a request to read or write information stored in the system 100 discussed above. As one example, a write request may include a file name and data to be stored, while a read request may include a file name. Further, while this example focuses on read and write requests as the two most common types of access requests, various other types of requests may be received from the user devices that may affect the data and metadata in the system 100 such as delete requests, migration requests, storage protection level change requests, and the like.

At 1204, the metadata node may determine whether the received access request is a read request or a write request. If a read request, the process goes to 1216, and if a write request, the process goes to 1206.

At 1206, in the case of a write request, the metadata node may generate a hash value of file name in the write request to use as the internal name, e.g., as discussed above with respect to FIGS. 5 and 6. For example, the I/O program may generate a data internal name, e.g., "ABCDE" as a hash value based on e.g., the file name of the data to be stored. In some examples, the username of the user or other information may be concatenated to the file name to ensure that the internal name is individually distinguishable from other internal names of other data stored in the system.

The I/O program may employ any of various hash functions, such as MD5, SHA-1, SHA-256, etc., to generate the hash values to use for the internal names herein. Alternatively, in other examples, the I/O program may use other techniques for generating individually distinguishable internal names for the data received from the user devices.

At 1208, the metadata node may determine which metadata node is responsible for storing metadata of the object based on the internal file name by referring to the partition data structure 216, as discussed above, e.g., with respect to FIGS. 5 and 11. For example, the metadata node may determine that metadata node M1 stores metadata of an object with "ABCDE" as its internal name because the internal name starts with "AB".

At 1210, in the case that the metadata node identifies itself as the metadata node responsible for managing the received data, the metadata node may send a request to a data node 104 to store the received data content, such as object data or other data content. As one example, the I/O program may be configured to select one of data nodes 104 in a random manner from the system configuration data structure 208. Alternatively, in other examples, each metadata node 102 may have certain ones of the data nodes 104 as their designated data storage nodes. Other variations will be apparent to those of skill in the art having the benefit of the disclosure herein.

Furthermore, in the case that the metadata node identifies a different metadata node as the metadata node responsible for managing the received data, the metadata node may send the received data to the other metadata node which may perform the above-described functions of sending the data content to one of the data nodes 104 for storage of the data content. Further, the other metadata node may thereafter manage the metadata for the stored data, rather than the metadata node that received the original request.

At 1212, the metadata node may create a new row in the node object data structure 212, as discussed above, e.g., with respect to FIG. 6, by using the internal name and the stored location with the ID of the data node 104 and the path to generate the stored location for the internal name. A directory to store objects on data nodes 104 may be configured in advance when the system is initially configured. By joining the directory path and the internal name, the stored location value may be determined. In the case that a different metadata node is handling the storage of the data, the different metadata node may perform these operations.

At 1214, the metadata node originally accessed by the user device may respond to the user device to provide an indication of completion of the operation, such as via sending an acknowledgment indicator, or the like. In some examples, such as in the case that a different metadata node is managing storage of the data, the original metadata node may wait to receive an acknowledgment from the other metadata node before sending an acknowledgment to the user device.

At 1216, in the case that the request is a read request, the metadata node may use the same hash function or other technique, as discussed above with respect to 1206 for determining the internal name for the requested data.

At 1218, the metadata node may determine, based on the internal name, which metadata node 102 is responsible for storing metadata of the requested data. For example, the metadata node may access the partition data structure 210 to determine the metadata node. For instance, in the example partition data structures 210 of FIGS. 5 and 11, and in the case that the internal name of the requested data is "ABCDE", the metadata node may determine that metadata node M1 is responsible for managing the data and metadata for the requested data since the internal name starts with "AB". If the metadata node that manages the data is a different metadata node from the metadata node that received the request, the metadata node that received the request may forward the request to the different metadata node, e.g., metadata node M1 in this example.

At 1220, if the metadata node that manages the data may access its node object data structure 212 to determine which data node 104 stores the requested data, and sends a request for the data to the identified data node 104. In the example node object data structure 212 in FIG. 6 discussed above, data with the internal name "ABCDE" is indicated to be stored at "D1:/mnt/data/ABCDE".

At 1222, the metadata node may receive the data from the data node D1, and send the received data to the metadata node that originally received the request from the client device, which sends the received data to the client device.

FIG. 13 is a flow diagram illustrating an example load-balancing process 1300 according to some implementations. In some cases, the process 1300 may be executed at least in part by the metadata node or other suitable computing device. As one example, the load-balancing program 116 executed by the processor(s) 202 of the metadata node 102 discussed above with respect to FIGS. 1 and 2 may include executable instructions for performing at least part of the process 1300 of FIG. 13. Further, in some cases, the load-balancing program may be executed by the data nodes 104 or by other nodes in multi-node systems that may benefit from load balancing.

At 1302, execution of the load-balancing program 116 may cause the processor(s) to monitor the load on the respective node. For example, periodically, randomly, in response to a trigger from the operating system, or the like, the processor(s) may check the load over a most recent period of time for one or more load parameters on the system, and may update the resource information data structure 214.

At 1304, the processor(s) may determine whether a threshold load on the node has been exceeded. For example, the processor(s) may compare the one or more load parameters in the resource information data structure 214 with one or more corresponding load thresholds for determining whether to perform load balancing as discussed above, e.g., with respect to FIG. 7. As one example, the load balancing may be initiated when processor utilization for a last period of time exceeds the processor utilization threshold in the respective node. If the threshold is exceeded, the process may go to 1306. If not, the process may return to 1302 to continue monitoring the load on the node.

At 1306, the processor(s) may calculate access load to be moved out of the node. For example, the processor(s) may access the node resource information data structure 214 and node load information data structure 216 of the node that initiates the load balancing, as discussed above with respect to FIG. 9 to determine the information for the first row of the node load calculation data structure 220. In the first iteration of this example, suppose that the processor(s) generate the node load calculation data structure 220 discussed above with respect to FIG. 9, e.g., with a processor utilization of 90 percent, access count of 1800, performance indicator of 20, access load to be moved of 200.

At 1308, the processor(s) may form a node group from the list of candidate nodes. For example, the processor(s) may access the node group configuration data structure 218 to determine the number of nodes to add to a node group. The processor(s) may then use a random number algorithm (or pseudorandom number algorithm) to generate a random number and may apply the random number to searching the resource information data structure 214 to randomly identify one or more nodes to add to the node group. Other techniques for randomly or pseudorandomly selecting nodes to add to the node group will be apparent to those of skill in the art having the benefit of the disclosure herein. In this example, suppose that the node count is two and that the load-balancing program identifies nodes M12 and M33 to add to the node group, as discussed above with respect to FIG. 9. Furthermore, suppose that during a second iteration of this operation, the load-balancing program identifies nodes M3 and M17 to add to a second node group, as discussed above with respect to FIG. 10.

At 1310, the processor(s) may request load information and access information of the other nodes in the node group. For example, the processor(s) may send requests to the selected nodes to obtain the respective node resource information data structures 214 and node load information data structures 216 of the nodes in the node group. Furthermore, sending the data structures 214 and 216 in response to the request from the processor(s) may cause the respective nodes to locally switch the indicator 706 of whether the node is currently in a node group from "No" to "Yes" until the processor(s) have determined whether the respective node is able to receive transfer of data from the node performing the load balancing. Following the example of FIGS. 9 and 10, in the first iteration of this example, the load-balancing program of M1 communicates with M12 and M33 to obtain the respective data structures 214 and 216. In the second iteration of this example, the load-balancing program of M1 communicates with M3 and M17 to obtain the respective data structures 214 and 216 from those nodes.

At 1312 the processor(s) may calculate access load to be moved in the other nodes in the node group, e.g., as discussed above with respect to FIG. 9. For example, the processor(s) may use the node information data structure 214 and node load information data structure 216 of the nodes selected as members of the node group to fill in the entries of the node calculation data structure 220 as discussed above with respect to FIG. 9.

At 1314, the processor(s) may determine whether the nodes in the group are able to receive a portion of data to be moved. If so, the process goes to 1318 to perform data migration. On the other hand, if the nodes in the node group do not have sufficient capacity to receive the amount of data to be moved, then the process returns goes to 1316 and then to 1308 to perform another iteration with a different node group. When checking whether any of the nodes in the node group are able to receive migration of data, the processor(s) may read the access load to be moved 912 whose transfer type 910 is OUT (i.e., corresponding to node ID M1 in FIG. 9) to obtain the value "200" and then determine whether there are any entries in the node load calculation data structure 220 that have sufficient access to be moved IN to receive the 200 accesses from the node M1. If so, the process may go to 1318, and if not, then to 1316. As discussed above with respect to FIGS. 9 and 10, in the first iteration of this example, there were no such nodes as shown in FIG. 9, and in the second iteration of this example, there were two such nodes, M3 and M17, as shown in FIG. 10.

At 1316, if the metadata nodes in the current node group do not have sufficient available access capacity to receive the portion of data to be moved from the first node M1, then the processor(s) may update the list of candidate nodes by removing one or more of the nodes in the current node group from the list of candidate nodes. The process then returns to 1308 to randomly select two new nodes from the list of remaining nodes that have not already been examined for forming a new node group. Thus, the processor(s) may perform one or more additional iterations of blocks 1308-1314 until a node able to receive migration of a portion of the metadata for load balancing is located. As one alternative example, the number of nodes in the node group may change for each iteration of FIG. 13, such as by increasing the number of nodes in the node group by one for each iteration, doubling the number of nodes for each iteration, or the like.

In the second iteration of this example, as discussed above with respect to FIG. 10, the processor(s) fill the entries in the node load calculation data structure 220 as discussed above with respect to FIG. 10. The difference from FIG. 9 is adding two entries 1002 and 1004 corresponding to node IDs M3 and M17. These two entries are filled in the same way as the first iteration. The comparison at 1314 results in a determination that two nodes in the node group are able to receive migration of the portion of metadata from the node M1.

At 1318, when the nodes in the node group have sufficient available capacity to receive the amount of metadata to be transferred from the first metadata node, the processor(s) may select one or more of the nodes to which to migrate the portion of metadata, and may migrate the portion of metadata to the selected nod(s). For determining which portion of metadata to migrate, the processor(s) may refer to the node load information data structure 216 to locate a portion of metadata that approximates the number of access load to be moved out. For instance, the processors may access the node load information data structure 216 of node M1 and determine the internal name of objects who have an access count, such as by starting at one end of the range of internal names to identify a contiguous range of metadata to be migrated. In this example, suppose that the processor(s) determine that metadata including metadata of object "CDEFG" is to be moved out from node M1 because this includes 200 accesses, corresponding to the number of access load to be moved out. In some cases, the metadata portion selected to be moved may not exactly match the number of accesses, but the portion may be approximated to the desired number of accesses to maintain migration of a contiguous range of internal names.

At 1320, the processor(s) may update the partition data structure 210, e.g., as discussed above with respect to FIG. 11. For example, the processor(s) may calculate and store the internal range in partition data structure 210. In the example, of FIG. 11, suppose that the internal name range AT-AZ was migrated to M3, as indicated at 1102. The processor(s) updates the partition data structure 210 as shown in FIG. 11, and sends the at least the updates to the other metadata nodes 102 in the system 100 so that all of the metadata nodes 102 have the same partition data structure 210 containing the same information. In some cases, rather than sending just the updates, the entire updated partition data structure 210 may be sent to each of the other metadata nodes 102 in the system 100.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art. Additionally, while several example systems have been described, numerous other systems able to implement the storage and load-balancing techniques herein will be apparent to those of skill in the art having the benefit of the disclosure herein.

Various instructions, processes, and techniques described herein may be considered in the general context of computer-executable instructions, such as programs stored on computer-readable media, and executed by the processor(s) herein. Generally, programs include routines, modules, applications, objects, components, data structures, executable code, etc., for performing particular tasks or implementing particular abstract data types. These programs, and the like, may be executed as native code or may be downloaded and executed, such as in a virtual machine or other just-in-time compilation execution environment. Typically, the functionality of the programs may be combined or distributed as desired in various implementations. An implementation of these programs may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed:

1. A system comprising:
   a first metadata node able to communicate with a plurality of other metadata nodes and a plurality of data nodes, the first metadata node and the other metadata nodes storing metadata corresponding to data objects stored by the data nodes, the first metadata node including one or more processors configured by executable instructions to perform operations comprising:
   determining, by the first metadata node, a load on the first metadata node over a last period of time based at least in part on comparing a load parameter with a load threshold;
   based on determining that the load parameter exceeds the load threshold, randomly selecting, by the first metadata node, one or more metadata nodes from a list of the other metadata nodes in the system to form a node group to which to move a portion of metadata;
   determining, by the first metadata node, the portion of metadata to move from the first metadata node, the portion of metadata corresponding at least in part to an access load for data access requests received from one or more user computing devices over the last period of time for accessing the data objects;
   determining, by the first metadata node, at least one of the randomly selected metadata nodes in the node group able to receive the portion of metadata; and
   transferring, by the first metadata node, the portion of metadata from the first metadata node to the at least one randomly selected metadata node, the portion of metadata transferred based at least in part on the access load.

2. The system as recited in claim 1, wherein the load parameter includes at least one of processor utilization, memory utilization, number of data access requests, or time to respond to data access requests.

3. The system as recited in claim 1, wherein the operation of determining the access load to move is based at least in part on determining a processor utilization over the period of time, a processor utilization threshold, and a number of data access requests received over the period of time.

4. The system as recited in claim 3, wherein the operation of determining at least one metadata node in the node group able to receive the portion of metadata comprises:
   determining an access load able to be moved onto individual ones of the one or more randomly selected metadata nodes in the node group; and
   determining the at least one metadata node in the node group based on the access load able to be moved onto the at least one metadata node being greater than the access load to move from the first metadata node.

5. The system as recited in claim 1, the operations further comprising:
   determining the portion of metadata to transfer based at least in part on the access load by determining relative access loads for a plurality of separate portions of the metadata of the first metadata node; and
   selecting a contiguous portion of the metadata of the first node to transfer based at least in part on the access load to move.

6. The system as recited in claim 1, the operation of randomly selecting the one or more metadata nodes further comprising:
   generating a value using at least one of a random number generator or a pseudorandom number generator to generate the value; and
   using the value to randomly select the one or more metadata nodes from the list of the other metadata nodes in the system.

7. The system as recited in claim 1, wherein the node group is a second node group, the operations further comprising:
   prior to randomly selecting one or more metadata nodes from the list of the other metadata nodes in the system to form the second node group, randomly selecting one or more different ones of the other metadata nodes from the list of the other metadata nodes in the system to form a first node group;
   determining that the one or more different metadata nodes in the first node group are not able to receive the access load; and
   subsequently randomly selecting the one or more metadata nodes to form the second node group.

8. A method comprising:
   determining, by one or more processors of a first metadata node of a plurality of metadata nodes, over a period of time, a load on the first metadata node based at least in part on comparing a load parameter with a load threshold;
   based on determining that the load parameter exceeds the load threshold, randomly selecting, by the first metadata node, one or more other metadata nodes from the plurality of metadata nodes to which to move a portion of metadata;
   determining, by the first metadata node, based at least in part on an access load, the portion of metadata to move from the first metadata node, the access load corresponding at least in part to data access requests received from one or more user computing devices over the period of time;
   determining at least one metadata node from the randomly selected one or more metadata nodes able to receive the portion of metadata; and
   transferring the portion of metadata from the first metadata node to the at least one randomly selected metadata node, the portion of metadata transferred based at least in part on the access load.

9. The method as recited in claim 8, wherein the load parameter includes at least one of processor utilization, memory utilization, number of data access requests, or time to respond to data access requests.

10. The method as recited in claim 8, wherein determining the portion of metadata to move is based at least in part on determining a processor utilization over the period of time, a processor utilization threshold, and a number of data access requests received over the period of time.

11. The method as recited in claim 10, wherein determining at least one metadata node from the randomly selected one or more other metadata nodes able to receive the access load comprises:
 determining an access load able to be moved onto individual ones of the randomly selected one or more metadata nodes; and
 determining the at least one metadata node based on the portion of metadata able to be moved onto the at least one metadata node being greater than the portion of metadata to move from the first metadata node.

12. The method as recited in claim 8, further comprising:
 determining the portion of metadata to transfer based at least in part on the access load by determining relative access loads for a plurality of separate portions of the metadata of the first metadata node; and
 selecting a contiguous portion of the metadata of the first metadata node to transfer based at least in part on the access load to move.

13. The method as recited in claim 8, wherein randomly selecting the one or more other metadata nodes comprises:
 generating a value using at least one of a random number generator or a pseudorandom number generator to generate the value; and
 using the value to randomly select the one or more nodes from the plurality of nodes.

14. The method as recited in claim 8, further comprising checking that the one or more randomly selected other metadata nodes have not already been selected for currently being considered as candidates for receiving data migration from another metadata node of the plurality of metadata nodes.

15. One or more non-transitory computer-readable media storing instructions that, when executed by one or more processors of a first metadata node of a plurality of metadata nodes, configure the one or more processors to perform operations comprising:
 determining, over a period of time, by the first metadata node, a load on the first metadata node based at least in part on comparing a load parameter with a load threshold;
 based on determining, by the first metadata node, that the load parameter exceeds the load threshold, randomly selecting one or more metadata nodes from the plurality of metadata nodes to receive a portion of metadata from the first metadata node;
 determining, based in part on an access load, a portion of metadata to move from the first metadata node, the access load corresponding at least in part to data access requests received from one or more user computing devices over the period of time;
 determining at least one metadata node from the randomly selected one or more metadata nodes able to receive the portion of metadata; and
 transferring, by the first metadata node, the portion of metadata from the first metadata node to the at least one randomly selected metadata node, the portion of metadata transferred based at least in part on the access load.

16. The one or more non-transitory computer-readable media as recited in claim 15, wherein the load parameter includes at least one of processor utilization, memory utilization, number of data access requests, or time to respond to data access requests.

17. The one or more non-transitory computer-readable media as recited in claim 15, wherein the operation of determining the access load to move is based at least in part on determining a processor utilization over the period of time, a processor utilization threshold, and a number of data access requests received over the period of time.

18. The one or more non-transitory computer-readable media as recited in claim 15, wherein the operation of determining at least one metadata node from the randomly selected one or more metadata nodes able to receive the portion of metadata comprises:
 determining an access load able to be moved onto individual ones of the randomly selected one or more metadata nodes; and
 determining the at least one metadata node based on the access load able to be moved onto the at least one metadata node being greater than the access load to move from the first node.

19. The one or more non-transitory computer-readable media as recited in claim 15, the operations further comprising:
 determining the portion of metadata to transfer based at least in part on the access load by determining relative access loads for a plurality of separate portions of the metadata of the first metadata node; and
 selecting a contiguous portion of the metadata of the first metadata node to transfer based at least in part on the access load to move.

20. The one or more non-transitory computer-readable media as recited in claim 15, wherein the operation of randomly selecting the one or more metadata nodes comprises:
 generating a value using at least one of a random number generator or a pseudorandom number generator to generate the value; and
 using the value to randomly select the one or more metadata nodes from the plurality of metadata nodes.

* * * * *